Patented July 20, 1926.

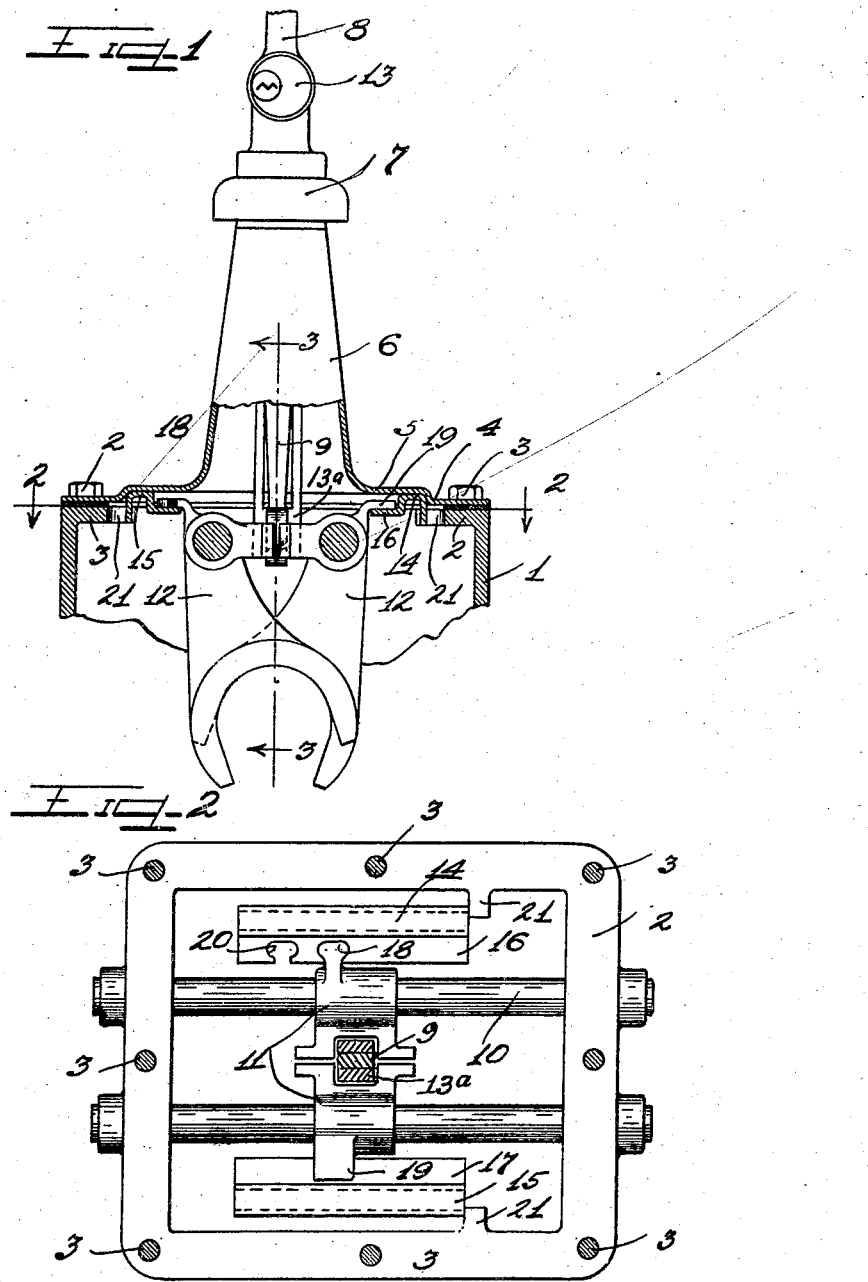

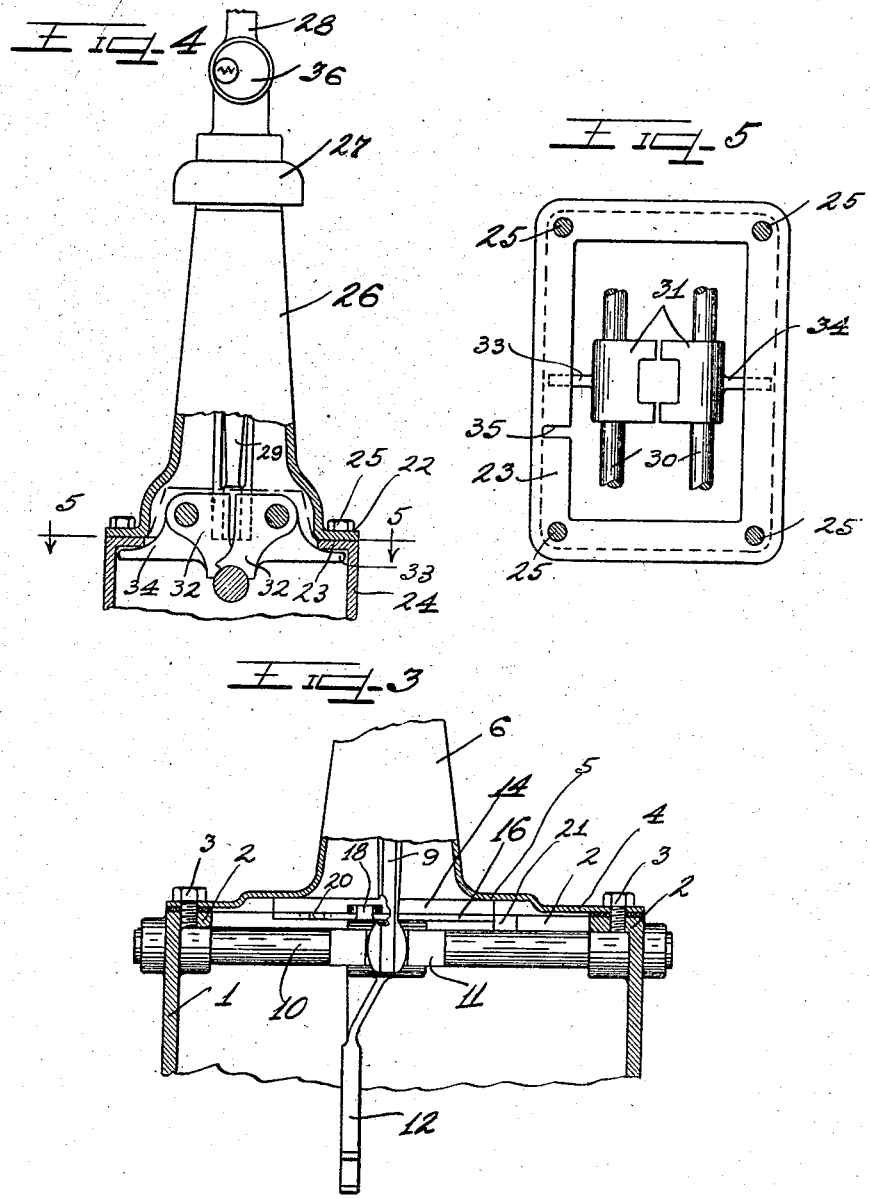

1,593,409

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

LOCKING MEANS FOR TRANSMISSION-HOUSING COVERS.

Application filed July 19, 1922. Serial No. 576,034.

This invention relates to locking means for transmission housing covers, and particularly to means which are adapted to prevent the removal of a cover from the transmission housing when the transmission gears therein are in a predetermined position.

In order to prevent the theft or unauthorized use of motor vehicles and other gear operated mechanisms, it is customary in many cases to lock the transmission gears thereof in a neutral or inoperative position by locking means which are associated with the gear shift lever or otherwise.

While such locking means are highly successful in attaining their desired purpose, it is nevertheless possible in certain cases to remove the transmission housing cover and the gear locking means, after which the gears may be shifted into operative position and the vehicle or other mechanism operated.

It is an object therefore of the present invention to provide locking means for a transmission housing cover which may only be released by shifting the transmission gears to a predetermined position.

It is also an important object of this invention to provide locking means which are associated with a transmission housing and the cover thereof, said locking means being designed to prevent relative vertical movement of the cover and the housing except when the gears in the transmission are in a predetermined position.

Other and further important objects of this invention will be apparent from the disclosures in the specification and the accompanying drawings.

The invention (in a preferred form) is shown on the drawings and hereinafter more fully described.

On the drawings:

Figure 1 is a fragmentary transverse section with parts in elevation showing an embodiment of the cover locking means of this invention.

Figure 2 is an enlarged section on the line 2—2 of Figure 1, with parts omitted and parts in elevation.

Figure 3 is an enlarged fragmentary detail section on the line 3—3 of Figure 1, with parts omitted and parts in elevation.

Figure 4 is a view similar to Figure 1 showing a slightly modified embodiment of the present invention.

Figure 5 is a slightly enlarged fragmentary section on the line 5—5 of Figure 4, with parts omitted and parts in elevation.

As shown on the drawings:

The reference numeral 1 indicates a transmission housing or casing which is provided at its upper edge with an inwardly extending integral flange 2, to which the transmission housing cover is secured by means of machine screws 3 which extend through apertures in said cover and which are engaged in threaded apertures through said flange. The casing or housing cover comprises a portion 4 which rests on the flange 2 and through which the machine screws 3 are engaged, an integral upwardly offset portion 5 and a central upwardly extending dome portion 6 which at 7 affords a universal support for a gear shift lever 8 which is provided with a depending portion 9 extending downwardly through the interior of the dome portion 6 into the housing or casing.

Mounted in the casing 1 and extending longitudinally thereof are parallel rods 10 which have blocks 11 slidably mounted thereon. The adjacent faces of said blocks 11 have notches or recesses formed therein adapted to receive the lower end of the depending portion 9 of the gear shift lever, and depending from said blocks and integral therewith are gear shifting forks 12 which engage transmission gears (not shown) in the casing to shift the same to a plurality of predetermined relative positions. When said blocks 11 are in the position shown in Fig. 2, the gears are in neutral or inoperative position. A key operated locking means is associated with the gear shift lever 8 and is indicated by the reference numeral 13. A locking member 13$^a$ slidable on the depending portion 9 is connected to be actuated by the key lock 13 and when lowered locks the lever in such a manner that said blocks cannot be shifted from such a neutral position when locked. Secured to the inner side of the portion 5 of the cover by welding or by other means inaccessible from the outside of the cover are channel members 14 and 15 which are provided respectively with laterally extending horizontal flanges 16 and 17 extending inwardly toward the blocks 11 and separated a short distance from the inner side of the portion 5 of the transmission housing cover.

Integral with the blocks 11 and projecting respectively between the flanges 16 and 17 and the portion 5 of the cover are projecting members 18 and 19, the projecting member 18 being formed to interfit with an open end slot 20 provided in the flange 16 so that said flange 16, and consequently the cover of the housing, may be moved vertically relative to said projecting member when the block 11 on which the projecting member 18 is mounted is shifted to such a position that said projecting member 18 and said slot 20 are in register. At all other times except when this condition of registry of the slot and projecting member exists, it is impossible to remove the transmission housing cover, since the engagement of the flanges 16 and 17 with said projections 18 and 19 prevents the vertical movement of the cover relative to the housing even though the machine screws 3 be removed. It is therefore apparent that removal of the cover would not be possible when the blocks 11 are locked in the position shown in Figure 2, that is in such a position as to prevent the gears from being shifted out of inoperative or neutral position.

Manipulation of the cover and of the channel members 14 and 15 in a horizontal plane after the removal of the machine screws 3 in such a manner as to bring the projecting member 18 and the slot or notch 20 into register is prevented by the provision of abutting means 21 which are integral with the flange 2 and extend inwardly therefrom to contact the ends of the channel members 14 and 15, as clearly shown in Figures 1 to 3 inclusive.

In the embodiment of this invention shown in Figures 4 and 5, a horizontal flange 22 comprising a portion of the transmission housing cover is secured to an inwardly extending integral flange 23 on a transmission housing 24 by means of machine screws 25 engaged through said flange 22 and engaged in threaded apertures in the flange 23. The cover for the housing or casing 24 is provided at its central portion with a dome portion 26 integral with the flange 22 and affording at 27 a support for a gear shift lever 28 which is provided with a depending portion 29 extending downwardly through said dome to the interior of said dome portion 26. Mounted in the transmission housing cover, and extending longitudinally thereof, directly beneath the dome portion 26, are parallel rods 30 which are similar to the rods 10 and which have blocks 31 similar to the blocks 11 slidably mounted thereon. Said blocks 31 are provided with depending gear shifting forks 32 of usual construction and are also provided with integral outwardly extending prongs 33 and 34 which extend under the flange 23 along the sides of the housing or casing 24, and consequently prevent relative vertical movement of the cover and the casing except when the block 31 on which the prong 33 is mounted is shifted into such position that such prong registers with an open end slot or notch 35 formed in the flange 23, as indicated in Figure 5. In view of the fact that the gear shift lever is provided with a locking device for preventing the shifting of the blocks 31 from the position shown in Figure 5 when locked, it is of course evident that the removal of the cover from the housing or casing 24 is prevented when said blocks are in such position by the engagement of the prongs 33 and 34 with the under side of the flange 23.

It will accordingly be observed that this invention provides simple and efficient means which are adapted to prevent the removal of a cover from a transmission casing or housing except when the gears therein are shifted to a predetermined position.

I am aware that numerous details of construction may be varied through a wide range without departing from the principles of this invention, and I therefore do not purpose limiting the patent granted hereon otherwise than necessitated by the prior art.

I claim as my invention:

The combination with a transmission casing, of a cover thereon, movable gear shift means in the casing, a projecting member on said movable means, and a plate secured to the inside of the cover extending beneath said projecting member and having a slot therein adapted to register with said projecting member to permit removal of the cover when the gear shift means are moved to a predetermined position, and means for locking the gear shift means from movement into such predetermined position.

In testimony whereof I have hereunto subscribed my name.

COLVIN L. JOHNSON.